United States Patent
Alotaibi et al.

(10) Patent No.: US 11,483,330 B1
(45) Date of Patent: Oct. 25, 2022

(54) SYSTEMS AND METHODS FOR DETECTING CYBERATTACKS TARGETING INTERNET OF THINGS ENVIRONMENTS

(71) Applicants: University of Tabuk, Tabuk (SA); Shaqra University, Shaqra (SA)

(72) Inventors: Bandar Alotaibi, Tabuk (SA); Munif Alotaibi, Riyadh (SA)

(73) Assignees: University of Tabuk, Tabuk (SA); Shaqra University, Shaqra (SA)

( * ) Notice: Subject to any disclaimer, the term of this patent is extended or adjusted under 35 U.S.C. 154(b) by 0 days.

(21) Appl. No.: 17/588,070

(22) Filed: Jan. 28, 2022

Related U.S. Application Data

(60) Provisional application No. 63/245,821, filed on Sep. 18, 2021.

(51) Int. Cl.
*H04L 9/40* (2022.01)
*G06N 3/04* (2006.01)

(52) U.S. Cl.
CPC ....... *H04L 63/1425* (2013.01); *G06N 3/0454* (2013.01); *H04L 63/145* (2013.01); *H04L 63/205* (2013.01)

(58) Field of Classification Search
CPC . H04L 63/1425; H04L 63/145; H04L 63/205; G06N 3/0454

USPC .......................................................... 726/22
See application file for complete search history.

(56) References Cited

U.S. PATENT DOCUMENTS

| | | | |
|---|---|---|---|
| 11,269,752 B1 * | 3/2022 | Bharadwaj | G06N 3/0445 |
| 11,355,033 B2 * | 6/2022 | Knott | G10L 15/02 |
| 2021/0224419 A1 * | 7/2021 | McBride | G06Q 10/1093 |
| 2021/0406642 A1 * | 12/2021 | Chorakhalikar | H04L 41/14 |
| 2022/0019863 A1 * | 1/2022 | Iskandar | G06N 20/00 |
| 2022/0019887 A1 * | 1/2022 | Buggins | G06N 3/0454 |
| 2022/0067535 A1 * | 3/2022 | Tang | G06N 3/0454 |
| 2022/0156580 A1 * | 5/2022 | Chao | G06N 3/08 |

OTHER PUBLICATIONS

Beaver et al., "An Evaluation of Machine Learning Methods to Detect Malicious SCADA Communications," in the Proceedings of 2013 12th International Conference on Machine Learning and Applications (ICMLA), 2: 54-59 (2013), US.

* cited by examiner

*Primary Examiner* — Badri Narayanan Champakesan
(74) *Attorney, Agent, or Firm* — Reichel Stohry Dean LLP; Natalie J. Dean; Mark C. Reichel

(57) ABSTRACT

Systems for the detection of and/or protection from suspicious or malicious activities in a network, for example, an Internet of Things environment, are provided. Methods for detecting suspicious or malicious activities in a network environment as also provided, as are methods for protecting network-based environments from suspicious or malicious activities using the systems hereof

19 Claims, 9 Drawing Sheets

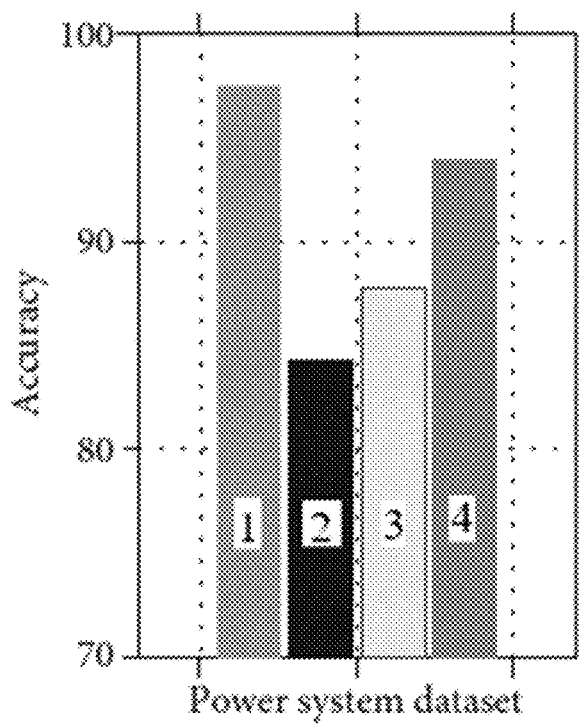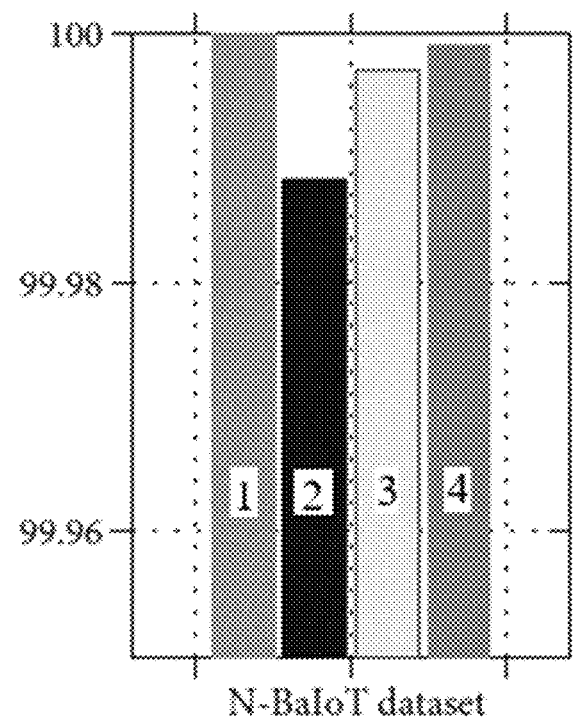
*FIG. 7(a)*      *FIG. 7(b)*

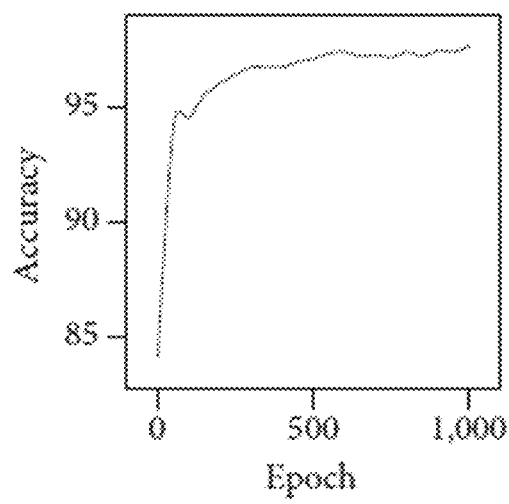 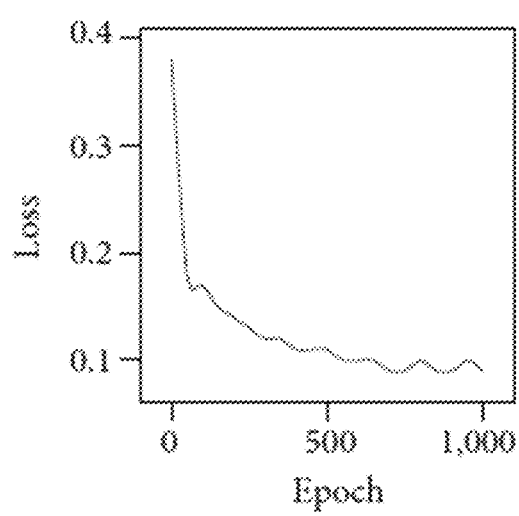
*FIG. 8(a)*          *FIG. 8(b)*

| Model | Power system | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Ours | 97.7 | 97.9 | 97.2 | 96.0 | 97.1 | 96.8 | 98.3 | 97.2 | 96.7 | 98.0 | 97.9 | 98.0 | 98.5 | 98.4 | 96.9 |
| [16] | 93.4 | 89.3 | 89.8 | 88.8 | 82.5 | 90.2 | 75.2 | 74.9 | 89.1 | 88.5 | 89.8 | 89.6 | 92.7 | 90.1 | 88.5 |
| [23] | 90.0 | 88.5 | 86.8 | 84.9 | 88.6 | 85.6 | 88.5 | 89.2 | 87.2 | 88.8 | 86.7 | 86.3 | 88.9 | 88.1 | 87.4 |
| RF | 93.8 | 93.1 | 94.5 | 93.3 | 94.0 | 93.4 | 94.3 | 94.0 | 93.2 | 94.0 | 94.3 | 93.9 | 96.0 | 94.8 | 92.9 |
| LR | 87.7 | 71.0 | 72.7 | 67.9 | 75.0 | 71.3 | 77.5 | 74.3 | 69.9 | 73.1 | 76.3 | 69.4 | 78.5 | 75.0 | 68.7 |
| DT | 92.5 | 90.0 | 89.5 | 89.4 | 92.3 | 91.3 | 89.2 | 92.3 | 90.1 | 87.9 | 91.2 | 89.7 | 92.7 | 90.6 | 88.5 |
| LDA | 77.6 | 73.2 | 72.1 | 69.0 | 76.2 | 72.3 | 78.7 | 74.0 | 70.5 | 73.2 | 77.6 | 69.6 | 79.1 | 74.9 | 70.0 |
| QDA | 50.2 | 51.4 | 48.8 | 50.7 | 44.9 | 47.5 | 49.3 | 47.8 | 52.8 | 50.6 | 43.2 | 54.3 | 49.7 | 46.4 | 57.3 |
| KNN | 89.4 | 87.4 | 86.7 | 85.1 | 89.2 | 85.8 | 88.0 | 89.2 | 86.6 | 88.4 | 86.0 | 86.0 | 88.9 | 88.1 | 87.5 |
| NB | 25.2 | 34.1 | 33.5 | 39.2 | 31.5 | 32.1 | 29.2 | 60.8 | 35.6 | 33.4 | 75.8 | 39.0 | 27.6 | 28.9 | 38.7 |
| XGB | 88.3 | 84.2 | 88.4 | 81.7 | 81.7 | 82.6 | 84.7 | 86.5 | 84.4 | 86.4 | 84.5 | 80.9 | 86.3 | 83.6 | 83.4 |
| MLP | 79.1 | 69.4 | 71.1 | 62.1 | 71.5 | 32.0 | 73.9 | 28.0 | 65.7 | 71.6 | 76.5 | 65.2 | 76.2 | 28.4 | 62.7 |
| RSS | 93.8 | 92.1 | 93.8 | 92.8 | 94.2 | 93.1 | 92.8 | 93.9 | 92.0 | 92.7 | 92.0 | 92.4 | 95.5 | 94.3 | 92.0 |
| GB | 90.0 | 85.7 | 87.5 | 82.5 | 83.5 | 83.9 | 85.6 | 87.3 | 85.5 | 87.7 | 86.0 | 84.6 | 87.1 | 85.7 | 85.3 |

*FIG. 9*

SYSTEMS AND METHODS FOR DETECTING CYBERATTACKS TARGETING INTERNET OF THINGS ENVIRONMENTS

PRIORITY

This application is related to and claims the priority benefit of U.S. Provisional Patent Application 63/245,821 filed Sep. 18, 2021. The content of the aforementioned application is hereby incorporated in in its entirety into this disclosure.

TECHNICAL FIELD

The present disclosure relates to systems and methods for detecting and protecting against cyberattacks targeting Internet of things (IoT) devices and applications.

BACKGROUND

Internet of things (IoT) devices are increasingly growing in number and playing critical roles in individuals' daily lives. IoT describes the network of physical objects—"things"—that are embedded with sensors, software, and other technologies for the purpose of connecting and exchanging data with other devices and systems over a network (e.g., the Internet). These devices can range from ordinary household objects to sophisticated industrial tools, including, for example, baby monitors, thermostats, car ignition starts, smart watches, and even medical devices such as pacemakers. IoT devices are behind many popular technology solutions and concepts, such as home automation, autonomous vehicles, smart cities, Internet of Medical Things, and advanced manufacturing. The IoT brings the power of the Internet, data processing, and analytics to the real world of physical objects.

In IoT, physical devices and everyday objects can be assigned Internet protocol (IP) addresses and have Internet connectivity. These devices can then leverage embedded sensors, processors, and communication hardware to gather, process and send the data they capture from their surrounding environments. By means of low-cost computing, the cloud, big data, analytics, and mobile technologies, physical things can share and collect data with minimal human intervention. Further, IoT systems can record, monitor and adjust each interaction between connected things. For consumers, this means interacting with the global information network (e.g., the Internet) without the intermediary of a keyboard and screen; many of their everyday objects and appliances can take instructions from that network with minimal human intervention. The industrial IoT is the use of smart sensors and actuators to enhance manufacturing and industrial processes, which not only can enable companies to pick up on inefficiencies and problems sooner to save time and money, but also facilitate quality control, sustainable and green practices, supply chain traceability, and overall supply chain efficiency.

There has been over a five million percent increase in IoT devices over the past 20 years. With the rapid growth of the IoT market comes increased cybersecurity risks. Recently, cyberthreat actors have exponentially increased their attack matrixes on IoT devices in an attempt to attack, disrupt, and steal personal data from millions of users who rely on these devices. However, the majority of such devices have little to no substantive security.

For example, in May 2017, a survey by Synopsys indicated that 67% of manufacturers believed that medical devices are prone to attacks and that medical devices are the most likely to be compromised within 12 months, but only 17% of manufacturers applied procedures to prevent cyberattacks. A 2020 report by McAffee Corporation (San Jose, Ca.) indicated that the COVID-19 coronavirus pandemic, in particular, has been taken advantage of by cyberthreat actors, resulting in a significant increase in several threat categories such as IoT malware, mobile malware, and PowerShell malware, for example. In one study, McAffee labs perceived 375 cyberthreats per minute during the first quarter of 2020. Thus, critical systems such as medical IoT devices and healthcare networks are targets of cyberthreat actors as the disease continues to spread.

Since IoT devices first came into play, there has been a critical shortage of viable cybersecurity protections in the IoT environment. There is little to no password protection available, no viable method through which to identify or patch security flaws, devices are attached to weak Wi-Fi home networks, usually no built-in multifactor authentication, and the devices often use out-of-date firmware and software. These deficiencies can make IoT devices vulnerable to various attacks such as denial-of-service (DoS), spoofing, data leakage, insecure gateways, eavesdropping, and the like. Such vulnerabilities can cause great harm through various different vectors. For example, attacks can harm the associated hardware and/or lead to system blackouts, rendering services unavailable and, particularly in the case of IoT applied to healthcare and industrial applications, leading to physical harm to individuals. Accordingly, the security capabilities of conventional IoT environments and devices in IoT technology do not satisfy minimum security requirements, such as CIA (confidentiality, integrity, and availability).

SUMMARY

Computer-implemented methods for detecting malicious or suspicious activity in a networked environment of one or more Internet-of-Things (IoT) devices are provided. In addition, computer-implemented methods for protecting from malicious traffic in a networked environment (e.g., comprising one or more IoT devices) are provided. In certain embodiments, such methods comprise executing on an integrated circuit the steps of: processing, with a first network architecture stored in one or more non-transitory computer storage media, first input data collected from a network of IoT devices to result in contribution outputs related to characteristics of activities within the network; generating a training data set from a combination of the contribution outputs of the first network architecture; training a second network architecture comprising a meta-classification model using the training data set; and collecting and processing second input data from the network (e.g., network traffic data between two or more of the IoT devices or between an IoT device and another device in the network) with the trained meta-classification model to output class scores. The output class scores generated can identify one or more portions of the second input data as being suspicious or benign.

In certain embodiments, upon identifying a suspicious network traffic data, at least the IoT device from which the identified suspicious data originated is isolated from the other IoT devices in the network. Additionally or alternatively, one or more security measures can be deployed on the at least one isolated IoT device or the networked environment.

The first network architecture of the method can comprise, for example, a set of at least two stacked residual network (ResNet) models each comprising at least one ResNet block, with each ResNet block comprising at least two convolutional layers comprising one or more convolutional filters, and each stacked ResNet model of the set being independently trained.

In certain embodiments, the set of at least two stacked ResNet models of the first network architecture comprises at least 5 stacked ResNet models and each ResNet model comprises at least 10 ResNet blocks. There, for example, processing the first input data from the network further comprises transforming the first input data from the network through a series of the at least two convolutional layers of each ResNet block to generate the contribution outputs.

Additionally or alternatively, processing the first input data from a network comprises transforming the first input data through a series of the at least two convolutional layers of each ResNet block, and operation of each ResNet block is defined as:

$$X^{i+1}=L^n(X),$$

$$X^{i+2}=L^{n+1}(X^{i+1}),$$

$$X^{i+3}=L^{n+2}(X^{i+2})+X, \quad (1)$$

where X is the data obtained from the network, L is the convolutional layer, n is the index of the convolutional layers, and i is 1-5. Furthermore, the fully connected layer of the meta-classification model (described below) can comprise a Softmax function.

In certain embodiments, processing the first input data from a network further comprises feeding output of each convolutional filter directly to a rectified linear unit systems (ReLU) activation function to transform each value to the same if it is positive. Additionally, processing the first input data from a network can further comprise padding the output of each convolutional filter with zeros so the output feature map has the same length as the second input data collected from the network.

The meta-classification model can comprise at least two dense layers and a fully connected layer.

The methods hereof can further comprise the step of reducing and downsampling the contribution outputs using pooling after the last ResNet block in each ResNet model processes such first input data. Such pooling can be, for example, average pooling. In certain embodiments, the average pooling is defined as:

$$y = \frac{1}{k}\sum_{l=1}^{k} ml, \quad (5)$$

where k is the size of the average pooling and m is each region downsampled by computing the average of its values. In certain embodiments, the average pooling size is 2, with a stride of 2.

Each convolutional filter of each ResNet block can comprise one or more kernels. Additionally, training the meta-classification model can further comprise initializing a weight matrix of each kernel using a Glorot (Xavier) uniform initializer at the beginning of training as follows:

$$l=\sqrt{6/f_{out}}, \quad (4)$$

where $f_{in}$ is the number of input units in the weight matrix and four is the number of output units in the weight matrix.

Systems for protecting a networked IoT environment and/or detecting suspicious or malicious activity/traffic therein are also provided. The systems hereof comprise a first module and a second module, at least one non-transitory computer storage media comprising at least the first module and the second module stored therein, and an integrated circuit in communication with the at least one non-transitory computer storage media. The first module can any of the first modules (or first network architectures) described herein. In certain embodiments, the first module comprises at least one set of at least two stacked ResNet models each comprising a plurality of ResNet blocks, wherein each ResNet block comprises at least two convolutional layers and operation of each ResNet block is defined as:

$$X^{i+1}=L^n(X),$$

$$X^{i+2}=L^{n+1}(X^{i+1}),$$

$$X^{i+3}=L^{n+2}(X^{i+2})+X, \quad (1)$$

where X is the data obtained from the network, L is the convolutional layer, n is the index of the convolutional layers, and i is 1 to 5. In certain embodiments, each convolutional layer of a ResNet block comprises 16 convolutional filters that output 16 feature maps. Additionally or alternatively, the size of each convolutional filter can be 9, with a stride of 1. Still further, each convolutional layer of a ResNet block can be a 1D convolutional layer.

The second module can comprise any of the second modules (or second network architectures) described herein.

In certain embodiments, the meta-classification model comprises at least two dense layers and a fully connected layer. In certain embodiments, the fully connected layer of the meta-classification model comprises a Softmax function configured for classification purposes and defined as:

$$f_i(s) = \frac{e^{s_i}}{\sum_{j=1}^{J} e^{s_j}} \text{ for } i = 1, \ldots, J,$$

where s is the input vector, and the meta-classification model outputs a vector that has values between zero and one and that has a sum of one. In certain embodiments, the first dense layer of the meta-classification model comprises 40 neurons and the second dense layer of the meta-classification model comprises 20 neurons.

The integrated circuit of the system can execute the first module to process a first set of input data from a network with the at least one set of stacked ResNet models to result in a first output from each of the ResNet models related to characteristics of activities within the network, and compile a training data set from a combination of the first outputs of the ResNet models. Additionally, the integrated circuit can execute the second module to: train the meta-classification model based on the training data, process a second set of input data from the network with the trained meta-classification model, and output class scores identifying the data obtained from the network as suspicious or benign.

In certain embodiments, the first input data and/or the second input data from the network comprises an input vector. In certain embodiments, at least one IoT device is operatively connected to the network, and the data obtained from the network comprises a packet to be transmitted or is being transmitted by a first IoT device to a target IoT device.

BRIEF DESCRIPTION OF THE DRAWINGS

The disclosed embodiments and other features, advantages, and aspects contained herein, and the matter of attaining them, will become apparent in light of the following detailed description of various exemplary embodiments of the present disclosure. Such detailed description will be better understood when taken in conjunction with the accompanying drawings, wherein:

FIGS. 7(a) and 7(b) show graphical data resulting from studies performed on the stacked deep learning methods hereof using various datasets, with FIG. 7(a) showing the average accuracy for each of the 15 power system subdatasets, and FIG. 7(b) showing the accuracy for three N-BaIoT subdatasets;

FIGS. 8(a) and 8(b) show graphical data related to convergence of the meta-algorithm during the training described herein, with FIG. 8(a) showing the accuracy against the number of epochs performed and FIG. 8(b) showing the loss against the number of epochs performed;

FIG. 9 shows data resulting from testing an embodiment of the stacked deep learning method of FIG. 2 as compared with conventional methods on power system datasets and evidences the accuracy of the stacked deep learning method of the present disclosure.

DETAILED DESCRIPTION

Figure 1:
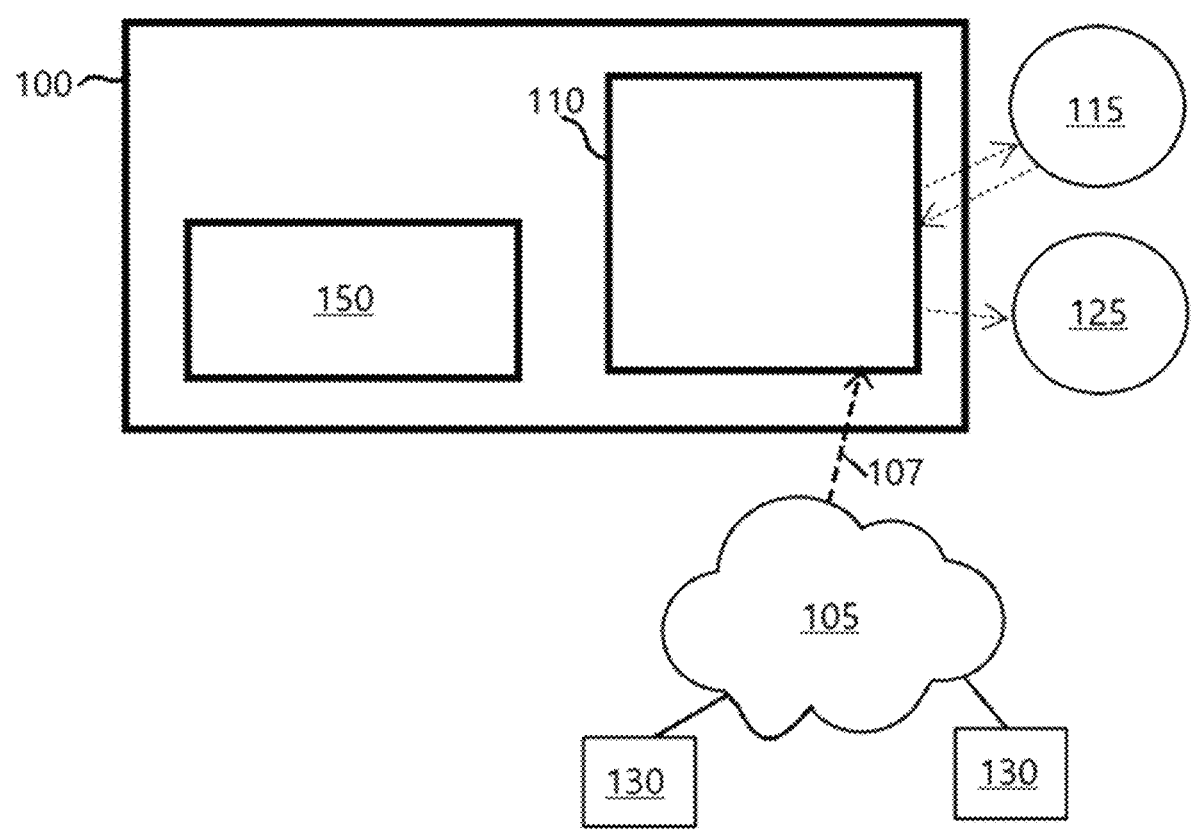
FIG. 1 shows a block diagram of a neural network processing system of the present disclosure.

For the purposes of promoting an understanding of the principles of the present disclosure, reference will now be made to the embodiments illustrated in the drawings, tables, and figures and specific language will be used to describe the same. It will nevertheless be understood that no limitation of the scope of this disclosure is thereby intended.

There are several characteristics that generally relate to the insufficient security capabilities of conventional Internet of Things ("IoT") devices including, for example, limited computational power, low storage capacity, difficult to be patched, low defense capability, and the heterogeneity of IoT devices within an IoT system/environment with respect to hardware, software, and protocol diversity. In general, conventionally it has been difficult for an IoT device with low computational power, limited memory size, and restricted battery capability to perform high-complexity security algorithms that demand intensive computation and communication load. Further, since most of the big data collected by IoT devices is not instantly processed by a conventional security intelligence and analytics system, the other devices in the IoT environment can also be in danger of being infected if one of the devices is infected by, for example, malware. Implementing and deploying security measures in IoT environments have been a long-lasting issue.

Security solutions such as network intrusion detection systems ("NIDs") that do not add overhead to the IoT devices and environments can be effective in presenting a first line of defense against cyberattacks. The main area of research within NIDS has conventionally been machine and shallow learning methods based on well-known algorithms, such as naive Baynes ("NB"), support vector machine ("SVM"), and decision tree ("DT"). Conventional machine learning-based NIDs approaches can have several advantages as compared to the rule-based expert system NIDs, including minimal to no human expert interaction (an expensive process that require labor-intensive procedures) and reduced errors when constructing the data.

Deep learning, a machine-learning method based on artificial neural networks with representation learning, has had some success with many applications such as computer vision, natural language processing, and speech recognition, and it has achieved state-of-the art results in many instances. Motivated by the success of machine learning-based approaches and the room for improvement in accurately classifying network traffic in IoT environments and identifying attacks, deep learning has been investigated as a means to improve the performance of NIDS, especially in terms of accuracy.

The present disclosure includes novel systems and methods that employ deep learning architecture comprising a stacked deep learning technique and pre-trained residual networks ("ResNets") to detect malicious or otherwise suspicious traffic data in a computer network and, in particular, malicious or otherwise suspicious activities targeting one or more IoT devices or an IoT environment. Such systems and methods can deeply learn the characteristics of suspicious activities within the environment by identifying complex patterns, and distinguish suspicious and malicious activities from normal (i.e. benign) traffic to overcome the shortfalls experienced with conventional systems and other methods.

FIG. 1 shows an example of a processing system 100. Processing system 100 is an example of a system in which the systems, components, and techniques described below can be implemented.

Processing system 100 is a system that performs network computations on a network 105 using an integrated circuit 110 for the purpose of identifying suspicious/malicious activity thereon and/or protecting a networked IoT environment. The integrated circuit 110 is an integrated circuit for performing network computations and can be augmented with, for example, a matrix computation unit (not shown) that performs vector-matrix multiplications in hardware. It will be appreciated that the integrated circuit 110 used to perform the techniques described herein can be any circuit including, for example, a processor, a microprocessor, a field programmable gate array, an application-specific integrated circuit, a graphics processing unit, tensor processing unit (TPU), a central processing unit, any circuitry now known or hereinafter developed capable of being configured to execute the systems and methods described herein, or any combination of the foregoing.

In particular, the processing system 100 implements a first network architecture on the integrated circuit 110 and, when implemented, processes inputs 107 from the network 105 using the circuit 110 to generate a first set of network inferences (i.e. the first set of outputs 115). Then, the first set of outputs 115 are fed to a second network architecture on the integrated circuit 110 as the training dataset (i.e. the training process).

During this training process, in certain embodiments, the number of epochs is at or around 200 epochs. The number of epochs is a hyperparameter that defines the number of times that the learning algorithm works through the entire training dataset (for example, the entire dataset is passed forward and backward through the neural network once). The second trained network architecture generates a second set of network inferences (i.e. a second set of outputs 125) that categorizes the inputs 107 from the network 105 as suspicious or benign. Accordingly, in certain embodiments, the processing system 100 is configured to monitor traffic traveling through a network 105 (e.g., an IoT environment) and detect an attack (attempted or otherwise) (e.g., characteristics are identified that are distinct from identified non-arbitrary organization of actions).

In at least one embodiment, the system 100 raises an alert to notify the network administrator (or take other designated action) to protect against the identified vulnerability.

In certain embodiments, the network 105 is an Intranet and/or a WLAN. In certain embodiments, the inputs 107 comprise network traffic data between devices 130 coupled with the network 105. For example, the inputs 107 can comprise observations or examples from the network 105 traffic data between the devices 130 describing certain conditions. A first set of network inferences—the first set of outputs 115—is then computed, which captures what the observations (i.e. the inputs 107) mean. In certain embodiments, the first network architecture on the integrated circuit 110 maps specific sets of input 107 variables to an output variable (e.g., the first set of outputs 115). Thereafter, the first set of outputs 115 are fed to the second network architecture on the integrated circuit 110 as the training dataset (i.e. the training process) to produce the second set of outputs 125 comprising class scores that can identify if such traffic data is suspicious (e.g., malicious activity on the network 105 targeting an IoT device 130 or otherwise, a cyber-attack on the network 105 or a device 130 connected thereto, or another type of security breach or incident or activity that is significantly different from an established baseline network activity threshold such that it may be a security breach or cyber-attack (each a "suspicious activity" or a "malicious activity") or benign (e.g., normal network traffic).

In certain embodiments, the network 105 is a networked environment that comprises one or more IoT devices 130 connected thereto. In certain embodiments, the networked environment 105 comprises an IoT environment and the inputs 107 comprise at least traffic data from the IoT environment.

The processing system 100 can include a network implementation engine 150 that comprises one or more computer programs on one or more computers (e.g., microprocessors, laptops, servers, mobile devices, and/or the like) in one or more physical locations. In certain embodiments, the implementation engine 150 generates instructions that, when executed by the integrated circuit 110, cause the integrated circuit 110 to perform the operations specified by the first and second network architectures to generate an output (e.g., the first set of outputs 115 and the second set of outputs 125, respectively) from a received network input 107. When the instructions have been generated by the implementation engine 150 and provided to the integrated circuit 110, the processing system 100 can receive and process network inputs 107 by causing the integrated circuit 110 to execute the generated instructions.

Examples of network architectures that can be implemented on the integrated circuit 110 are as follows. Now referring to FIG. 2, in certain embodiments, the first network architecture 210 comprises at least five stacked ResNet models 212 and the second network architecture 220 comprises one meta-classification model 222 (e.g., a meta-algorithm) comprising at least two dense layers 224a, 224b followed by a fully connected layer 226 (e.g., a Softmax function layer) and is configured to compute and output class scores.

ResNet Model Background

Deep learning is considered a subset and evolution of machine learning. Deep learning has reshaped the field of machine learning and has recently gained the attention of the machine learning research community due to its powerful performance. It can extract meaningful data representation and features. Moreover, it can handle a massive amount of data in short span of time, while maintaining outstanding performance. Some deep learning algorithms such as the convolutional neural network ("CNN") do not require any preprocessing steps.

Deep learning algorithms have been able to solve many complicated problems. Particularly, CNN is an advanced deep learning method that has achieved state-of-the-art results in many fields, such as facial, gait, action, and speech recognition; visual object recognition; and object detection. CNN is composed of multiple processing layers, such as convolutional, subsampling, and fully connected layers. The ultimate goal of these layers is to extract and learn the important features and representations of data. Although CNN is making major advances in solving very complicated issues that cannot be solved by other algorithms, optimizing and finding the best CNN model are still complicated issues. In the last decade, researchers have proposed many advanced deep CNN models, such as AlexNet, ResNet, Xception, visual geometry group ("VGG"), and Inception. ResNet in particular has shown great performance and has achieved state of the art compared with other CNN architectures.

Figure 3:
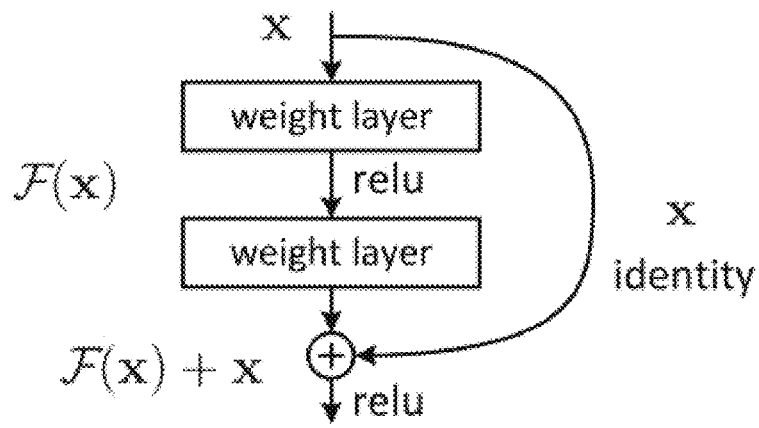
FIG. 3 shows a schematic diagram representative of a ResNet model having an identity shortcut connection that skips one or more layers.

The ResNet models 212/first network architecture 210 can comprise as many ResNet blocks 214 (e.g., a plurality of ResNet blocks 214). Each ResNet block 214 has a special underlying mapping and the "identity shortcut connection" feature, which skips one or more layers 216 through a path. FIG. 3 shows a representation of such an identity shortcut connection feature in connection with ResNet. This feature can reduce training error and speed up the training process.

Each of the ResNet models 212 of the first network architecture 210 can be bundled with a plurality of ResNet blocks 214, with each of the ResNet blocks 214 made up of at least two convolutional layers 216. In operation, and as described below, each convolutional layer 216 can feed into the next layer and/or directly into the layers 216 multiple (e.g., 2-3) hops away. In certain embodiments, more than two layers 216 can be stacked to result in improved accuracy and performance; indeed, ResNet architectures 212 can be scaled up by adding layers 216 (depth) as may be desired for a particular application. In certain embodiments, each of the ResNet blocks 214 independently comprises up to five convolutional layers 216 (e.g., 2, 3, 4, or 5 layers). In certain embodiments, each of the ResNet blocks 214 comprises more than five convolutional layers 216 (e.g., 6, 7, 8, 9, 10, or more than 10 layers). In certain embodiments, each of the ResNet models 212 comprises at least one ResNet block

214. In an exemplary embodiment, each of the ResNet blocks 214 comprises five convolutional layers 216.

Stacked generalization (or simply stacking) was proposed by Wolpert in 1992. A stacked generalization ensemble is a technique that combines multiple base-level classification models via a metaclassifier or a metalearner. The systems and methods hereof then use the combined outputs of these trained base-level models as features to train the meta-classification model 222 of the second network architecture 220. The procedure of stacked generalization can be as follows: two disjoint sets of data are split from the training set, the base-level classification models (ResNet models 212) are trained by utilizing the first part, the base-level classification models (trained ResNet models 212) are tested using the second part, and the predictions generated from the base classification models (trained ResNet models 212) are used as inputs and the ground truth table as outputs (e.g., output 115) to train the meta-classification model 222. Note that the training and the testing parts of stacked generalization are similar to cross-validation; however, the base-level classification models are combined (e.g., nonlinearly) instead of utilizing a winner-takes-all technique. It is well established that the accuracy resulting from stacking is higher than that of individual classifiers. The meta-classification model 222 of the present systems and methods utilizes this approach.

The systems and methods hereof employ one of the most advanced machine learning algorithms to detect cyberattacks against IoT devices, and are based on deep learning. In at least one embodiment, at least five ResNet models 212 $C^i=c^1, \ldots, c_i$, and the outputs 115 of these models 212 are connected to a new model (e.g., the meta-classification model 222) that takes their output 115 as new training data. Algorithm 1 set forth in Table 1 describes at least one embodiment of the function of the stacked ResNet models 212 of the present disclosure.

TABLE 1

Algorithm for stacked deep ResNet models.

Input: Training Data D = {$x^t$, $y^t$} in
Output: ensemble classifier H out
Initialisation:
   Step 1: learn base-level classifiers $C^i$
   for i =1 to 5 do
     Learn $C^i$ based on D.
   end for
   Step 2: form new data set of predictions $D^h$
   for i=1 to 5 do
     $D^h$ ={$x^p$, $y^t$}, where $x^p$ = {$c^1(x^1), \ldots c^i(x^t)$}
   end for
   Step 3: learn a meta classifier
   Learn H based on $D^h$
   return H As used herein, D is the dataset, $x^t$ is the input sample, $y^t$ is the label for that sample, and t is the index.

In certain embodiments, each ResNet model 212 comprises five or more ResNet blocks 214. In certain embodiments, each ResNet model 212 comprises 10 Resnet blocks 214. In certain embodiments, each one of the 10 ResNet blocks 214 can have two convolutional layers 216. In certain embodiments, each of the ResNet models 212 has the same settings/paths. Additionally or alternatively, each path of a ResNet block 214 can share the same topology or comprise different topologies.

In certain embodiments, operation of each ResNet block 214 is defined as:

$$X^{i+1}=L^n(X)$$

$$X^{i+2}=L^{n+1}(X^{i+1}),$$

$$X^{i+3}=L^{n+2}(X^{i+2})+X, \quad (1)$$

where X is the data obtained from the network 105 (e.g., an input vector/input 107) fed into the convolutional layer 216, L is the convolutional layer 216, n is the index of the convolutional layers 216, and i is 1 to 5.

As described above, the network architecture of the ResNet models 212 can define the number and configuration of layers 216 in the network architecture 210 and the values of the parameters for each of the layers 216. In certain embodiments, all of the ResNet models 212 have the same settings or parameters. In other embodiments, one of more of the ResNet models 212 can have different parameters, or particular layers 216 within a Resnet block 214 can have parameters that differ from other layers 216 within such block 214.

For example, each convolutional layer 216 of a ResNet block 214 can have one or more convolutional filters (e.g., kernels) that output feature maps. The kernel size can be adjusted as desired. In this manner, each ResNet block 214 can comprise many hyper-parameters to be adjusted as desired (i.e. the kernel size of the convolutional layer 216 for each path). In certain embodiments, each convolutional layer can comprise two or more filters. In certain embodiments, each convolutional layer 216 can comprise 2-50 filters. In certain embodiments, each convolutional filter has 16 convolutional filters that output 16 feature maps. Still further, in certain embodiments, one convolutional layer 216 is used.

The size of each convolutional filter can be selected as desired. In certain embodiments, the size of each convolutional filter is 9, with a stride of 1. The values of these parameters can be determined empirically, for example. In certain embodiments, the convolutional layers 216 of each ResNet block 214 perform a split-transform-merge paradigm, which divides the inputs into groups of feature maps and performs normal convolution respectively such that the outputs are depth-concatenated and then fed into a 1D convolutional layer of each block. In certain embodiments, 1×1 (1D) convolutional layer is used (e.g., where the input is one-dimensional as with an IoT enviroment).

Where desired, the output of each filter can be fed directly to a rectified linear unit systems ("ReLU") activation function to transform each value v to the same if it is positive, or it will output zero, as shown in Equation (2)

$$f(x)=\max(0, v), \quad (2)$$

where v is the input value to the activation function. The operation of each convolutional kernel can be defined as follows:

$$X^i=R(K^{n}*m^{n-1}+\beta^n), \quad (3)$$

where * is the convolution operator. It convolves the kernel $K^i$ with the input image $m^{i-1}$, adds the bias term β, and then applies the rectifier function R, as defined in Equation (2), to produce a feature map $m^i$. The output of each filter is padded with zeros so the output feature map has the same length as the input.

Meta-Classification Model

Figure 2:
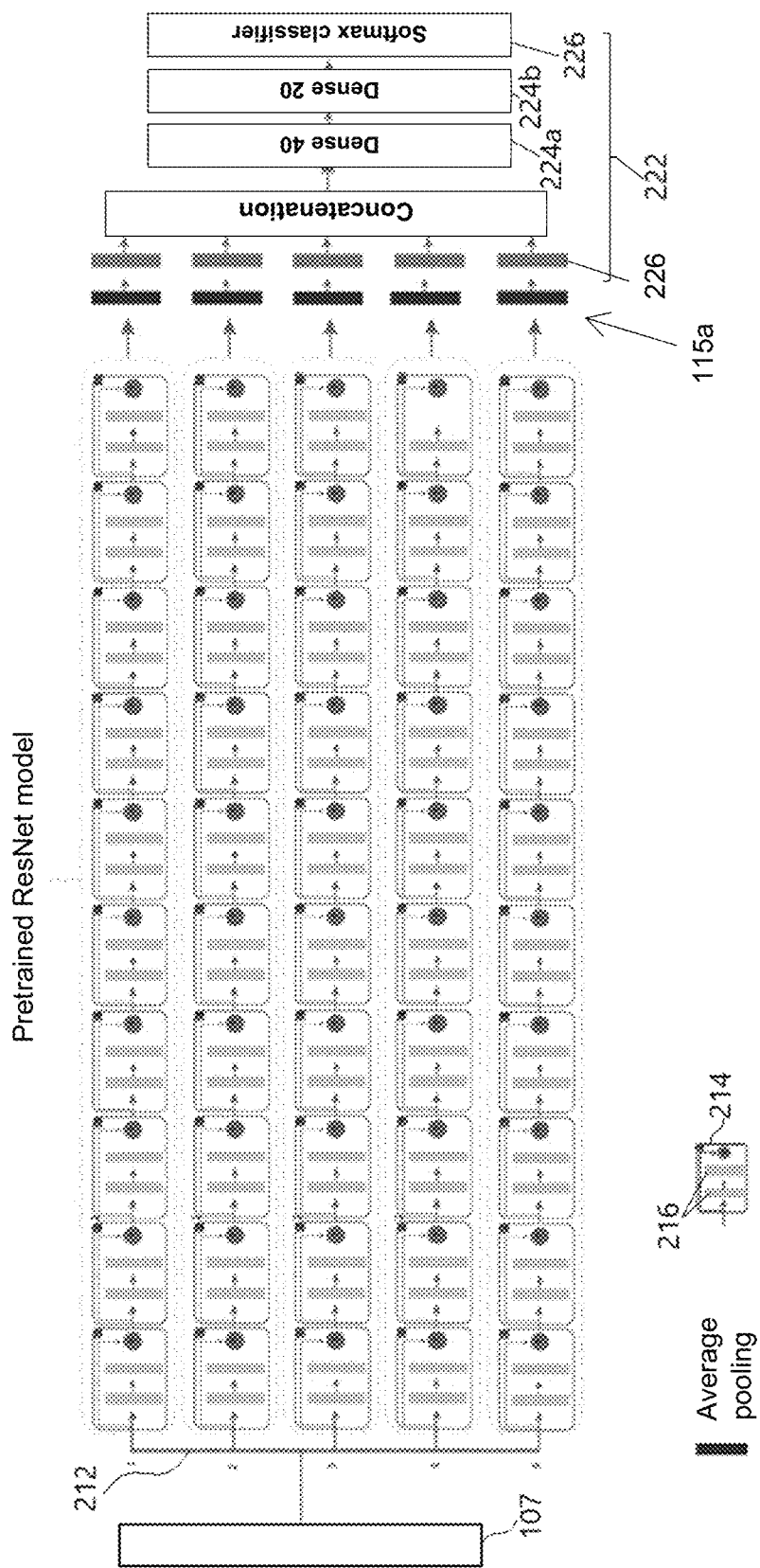
FIG. 2 shows a representative diagram of an embodiment of a stacked deep learning method of the present disclosure, which comprises five pretrained residual network ("ResNet") models, each of which are bundled with 10 residual blocks.

Referring back to FIG. 2, in this at least one embodiment of the processing system 100, each sub-ResNet model 212 comprises 10 ResNet blocks 214, and each ResNet model 212 is trained individually with training data D. Thereafter, an entirely new model (the second network architecture 220, e.g., the meta-classification model 222) is trained to learn how to best combine the contributions from all five sub-models (e.g., the ResNet models 212). Accordingly, as shown in FIG. 2, at the testing stage, each of the five submodels 212 receives an input 107 (e.g., a single vector) and transforms it through a series of layers 216. The outputs of all ResNet models 212 are then combined to form a new training dataset $D^h$, which is fed directly to the new meta-algorithm H (e.g., an algorithm of the meta-classification model 222). As previously described, the new meta-algorithm 222 can comprise two dense layers 224a, 224b, for example, followed by a fully connected layer 226 to normalize the second set of output 125 to a probability distribution over predicted output classes. The fully connected layer 226 can be, for example, a Softmax function configured for classification purposes and defined as $$f_i(s) = \frac{e^{s_i}}{J_{j=1} e^{s_j}} \text{ for } i = 1, \ldots, J,$$

where s is an input vector, and the meta-classification model 222 outputs a vector that has values between zero and one and that has a sum of one. Accordingly, the second set of output 125 can comprise output class scores from which the input data 107 obtained from the network 105 can be identified as normal (i.e. benign) or as suspicious.

In certain embodiments, the first dense layer 224a comprises 40 neurons and the second dense layer 224b comprises 20 neurons; however, it will be appreciated that any number of neurons can be used in either layer as desired.

Model Training

In operation, each of the ResNet models 212 is trained individually with training data (D). In certain instances, training data comprises selecting one model from the set of allowed models (or, in a Bayesian framework, determining a distribution over the set of allowed models) that minimizes the cost criterion. Numerous algorithms are available for training ResNet models 212, most of which can be viewed as an application of optimization theory and statistical estimation.

Thereafter, an entirely new model (i.e. of the second network architecture 220) (e.g., a meta-classification model 222) is trained to learn how to best combine the contributions (i.e. the first set of outputs 115 or the "training data set") from two or more of the ResNet models 212 (i.e. of the first network architecture 210). In certain embodiments, the new model 222 is trained based on consolidated contributions from all of the ResNet models 212 (i.e. the first set of outputs 115 or the training data set).

In the validation studies described below, at the beginning of training the networks 210, 220, the bias terms in the model were initialized to 0, and the weight matrix of each kernel was initialized using the Glorot (Xaiver) uniform initializer. The Xavier initializer draws samples from a uniform distribution within the limits -1 and 1, where $$l = \sqrt{6/f_{in} + f_{out}} \quad (4)$$

and $f_{in}$ is the number of input units in the weight matrix and $f_{out}$ is the number of output units in the weight matrix. After the last ResNet block, average pooling (avg pooling) was used to reduce the size of the data, as shown in FIG. 2. In the studies, the average pooling had a slightly better result than max pooling; however, it will be understood that either approach (or other pooling methodologies) can be used. An average pooling size of 2 was used, with a stride of 2, to reduce and downsample the feature maps (e.g., contribution output). The average pooling is defined as Equation (5):

$$y = \frac{1}{k} \sum_{i=1}^{k} ml, \quad (5)$$

where k is the size of the average pooling. The input to average pooling is divided into rectangular pooling regions. Each region m is downsampled by computing the average of its values.

At the fully connected layer 226, Softmax is used for classification. Softmax is defined as Equation (6) (also noted above):

$$f_i(s) = \frac{e^{s_i}}{J_{j=1} e^{s_j}} \text{ for } i = 1, \ldots, J, \quad (6)$$

where s is an input vector, and it outputs a vector of values between zero and one and that has a sum of one.

Cross entropy was also used during training which had a loss function, as well as Adam optimizer for the optimization of the model (chosen because it has the advantages of both the RMSProp optimizer and AdaGrad optimizer). Default parameter values were also used, as suggested in previously published data. Accordingly, values of $\beta_1$ to 0.9, $\beta_2$ to 0.999 were set, and the learning rate decay was set to 0.

While conventional ResNet has proven powerful in many applications, one major drawback has been that deeper network usually requires weeks for training making it infeasible in real-world applications. However, the systems and methods provided herein overcome this hurdle through the combination of the ResNet models 212 with the meta-classification model 222 and training methodologies of the present disclosure.

An intrusion detection method that employs the systems hereof is also provided. The intrusion detection method can be, for example, implemented in a computer network or utilizing a processor in communication with a network (e.g., the Internet) and/or by any of the embodiments of the processing system 100 described herein. In certain embodiments, the intrusion detection method comprises processing data obtained from a network 105 with a first set of stacked ResNet models 212 each comprising at least one ResNet block 214 (e.g., 10 ResNet blocks 214) to result in a contribution output from each of the ResNet models 212 related to characteristics of activities within the network. As described above, each ResNet block 214 can comprise at least two convolutional layers 216, with each layer 216 comprising one or more convolutional filters (e.g., 16 filters). Further, each ResNet model 212 of the set can be independently trained. Additionally or alternatively, each path of a ResNet block can share the same topology or comprise different topologies.

In certain embodiments, the step of processing data obtained from a network 105 with a set of stacked ResNet models 212 further comprises transforming the data obtained from the network 105 through a series of the at least two convolutional layers 216 of each ResNet block 214 to create the contribution output. In certain embodiments, the convolutional layers 216 of each ResNet block 214 perform a split-transform-merge paradigm, which divides the input 107 into groups of feature maps and performs normal convolution respectively such that the outputs are depth-concatenated and then fed into a 1×1 (1D) convolutional layer 216.

In certain embodiments, the intrusion detection method further comprises compiling a training data set (i.e. output 115) from a combination of the contribution output of the ResNet models 212 as described herein (see, e.g., FIG. 2). The method can further comprise training a meta-classification model 222 based on the training data set (i.e. output 115). In certain embodiments, the meta-classification model 222 comprises at least two dense layers (e.g., a first dense layer 224a and a second dense layer 224b) and fully connected layer 226 as described.

The intrusion detection method can further comprise processing data obtained from the network 107 with the trained meta-classification model 222 to output class scores identifying malicious activities within the network (i.e. output 125).

Figure 4:
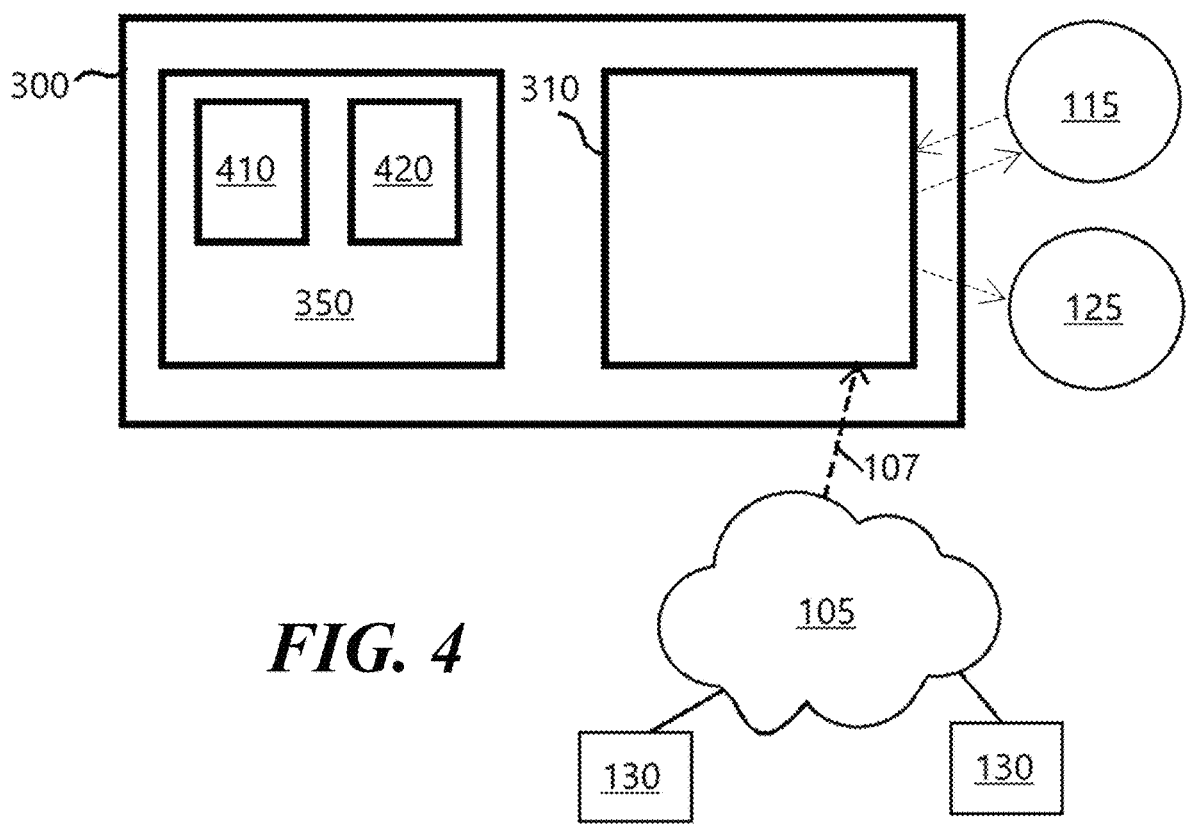
FIG. 4 shows a block diagram of an intrusion detection system of the present disclosure.

Now referring to FIG. 4, an intrusion protection and/or detection system 300 is also provided. Such a system 300 can be applied to a networked IoT environment and implemented using, for example, the processing system 100. In at least one embodiment, the intrusion detection system 300 comprises at least one database 350 configured to store at least two modules, and at least one computing device 310 (comprising, for example, an integrated circuit) operatively connected to the at least one database 350 and configured to access and execute the at least two modules. In certain embodiments, the modules comprise a first module 410 and a second module 420. In certain embodiments, the at least one database 350 comprises at least one non-transitory computer storage media.

The first module 410 can comprise the first network architecture 210 of system 100 comprising, for example, at least one set of stacked ResNet models 212, each ResNet model 212 comprising a plurality of ResNet blocks 214 (e.g., 10 ResNet blocks 214), each ResNet block 214 comprising at least two convolutional layers 216.

The first module 410 can further be configured to process data obtained from a network (i.e. input 107) with the at least one set of stacked ResNet models 212 to result in a first output 115a from each of the ResNet models related to characteristics of activities within the network. Furthermore, the first module 410 can be configured to compile a training data set from a combination of the first outputs 115a of the ResNet models (i.e. output 115 of the processing system 100) (see FIG. 2).

The second module 420 can comprise the second network architecture 220 of system 100 comprising, for example, a meta-classification model 222 with at least two dense layers 224a, 224b and a Softmax function 226. The second module 420 can be configured to train the meta-classification model 222 using the training data (i.e. output 115 received from the first module 410) such that the trained meta-classification model 222 can process a second set of input data from the network and output class scores that classify the data obtained from the network as suspicious or benign. In certain embodiments, the trained meta-classification model 222 is further configured to identify output patterns associated with benign (or normal) activity within the data obtained from the network (i.e. input 107). In this manner, the system 300 can be used to identify malicious or otherwise suspicious activities within the network 105.

The intrusion detection system 300 can further comprise at least one IoT device 130 operatively connected to the network 105. Additionally, the data (i.e. input 107) obtained from the network 105 can comprise a packet to be transmitted by a first IoT device 130 to a target IoT device 130. While FIG. 4 only shows two devices 130, it will be appreciated that in any of the embodiments described herein, any number of devices 130 may be connected with the network 105 and, thus, the data traffic to and from such devices 130 can be assessed/processed by the processing and/or intrusion detection systems 100, 300.

The systems and methods described herein were evaluated on two heterogenous IoT environments, making the method more thorough and able to detect more attacks than conventional methods. Further, the systems and methods hereof were able to achieve promising results on two widely used datasets involving IoT traffic.

Smart things with extensive heterogeneity can reside in diversified IoT environments and can connect to each other via assorted communication links and networking protocols. For instance, devices that reside in smart homes differ from devices that reside on smart grids. Smart home IoT devices include but are not limited to smart appliances, security cameras, baby monitors, connected lighting, smart meters, doorbells, thermostats, solar panels, smoke alarms, and webcams. These devices could reside in one IoT environment setting (i.e., smart home setting), but not in every IoT environment. These devices communicate with each other using a specific network protocol and connect with the gateway using the same or another network protocol. Devices that reside in different IoT environments such as smart grids can range from power generators, intelligent electronic devices (IEDs), breakers, and substation switches. The systems and methods provided herein can be utilized in connection with any such IoT environments, IoT devices, connection links, and/or protocols. Table 2 sets forth some possible descriptions of a variety of the IoT to ins used herein.

TABLE 2

| Description of some IoT terms. | |
|---|---|
| Term | Description |
| Smart meter | An IoT device that reports information such as gas, water, or energy consumption of a home or organization. |
| Thermostat | A device that senses a given system's temperature and carries out actions to maintain that temperature. It also permits users to remotely control home heating or air conditioning. |
| Gateway | A central hub that acts as a bridge that connects sensors or actuators to the Internet. |
| Switch | A data link layer device that uses a 48-bit identifier (a.k.a. MAC addresses) to convey data. |
| WiFi access point | A networking device that connects WLAN devices to the wire of the network through a router or a switch. |

Figure 5:
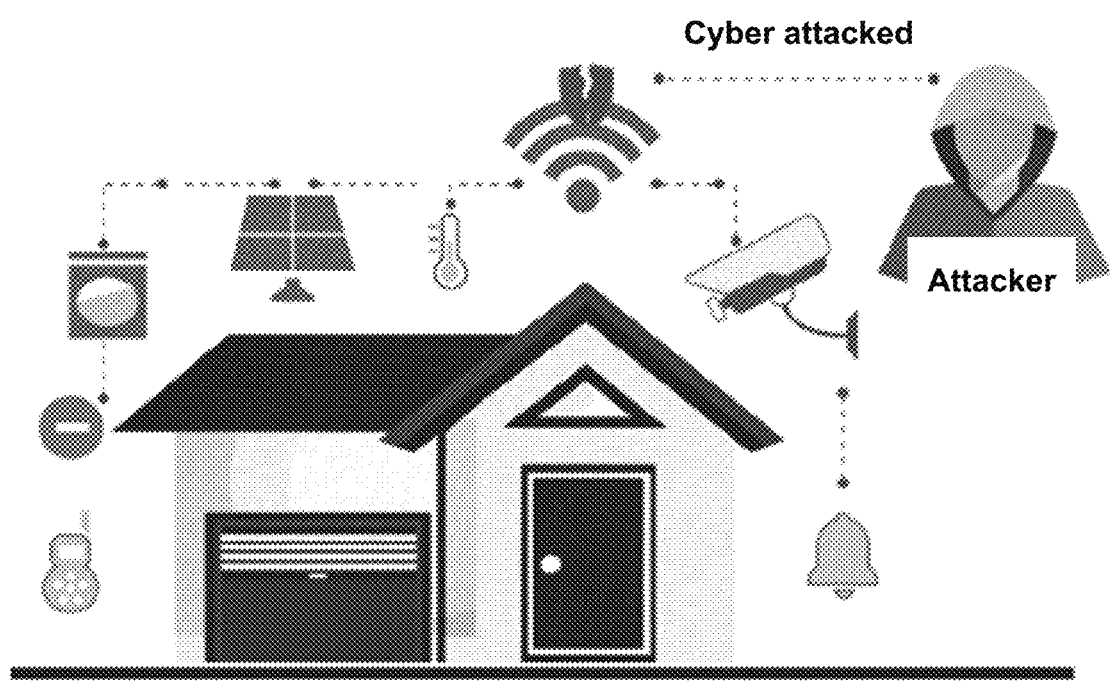
FIG. 5 shows a schematic of a smart home environment attack scenario where an attacker is in control of smart home Internet of Things ("IoT") devices through communication technology.

To evaluate and validate the systems and methods of the present disclosure, two exemplary attack scenarios targeting two heterogeneous IoT environments were evaluated by way of non-limiting examples; namely, the smart home and smart grid. The smart home environment attack scenario shown in FIG. 5 comprises various IoT devices that can include (for example) doorbells, thermostats, baby monitors, security cameras, and webcams, These devices can connect to a wireless network (e.g., Wi-Fi) access points, which can act as coordinators to relay traffic to the wired side of the networkthrough a data link layer device (i.e., a switch). For this study, cyberattacks were launched using two famous botnets known as Bashlite and however, it will be understood that the resulting data can equally relate to like cyberattack strategies.

Figure 6:
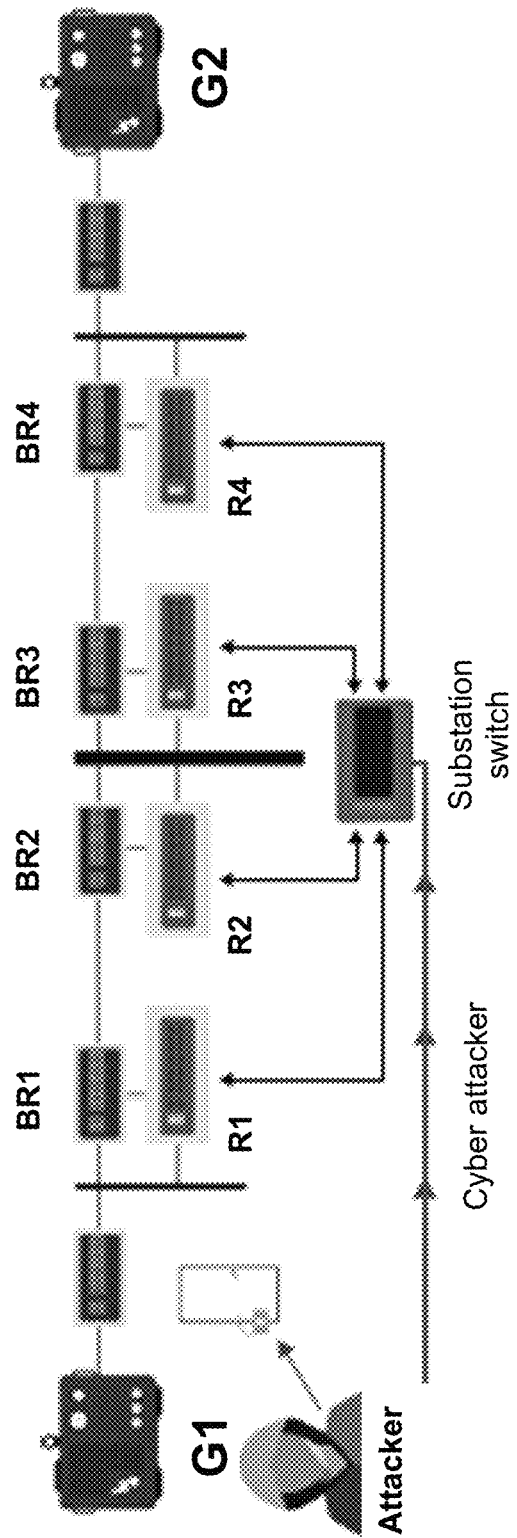
FIG. 6 shows a schematic of a smart home environment attack scenario where an attacker is in control of power system architecture through a substation switch.

Examples of attacks launched by Bashlite botnet can be in the form of the following:
   Scan: sniffing the network to find vulnerable devicesin order to launch other attacks
   Junk: launching spam messages
   User datagram protocol (UDP): traffic launched using the UDP protocol to flood the network
   Transmission control protocol (TCP): traffic launched utilizing the TCP protocol to flood the network
   COMBO: launching spam messages and connecting to a given IP address and port number The possible attacks launched by Mirai can be as follows:
   Scan: finding vulnerable devices by scanning thenetwork
   Ack: launching attacks to flood the network using ack packets
   Syn: flood the network by launching syn packets
   UDP: launching UDP traffic to flood the network
   UDPPlain: flood the network with UDP traffic using fewer options The smart grid attack scenario shown in FIG. 6 comprises various components that form at least one embodiment of a power system framework configuration. The configuration comprises power generators (denoted by G1 and G2) and intelligent electronic devices (labeled R1 to R4), whose purpose is to switch the breakers on or off. The breakers denoted by BR1-BR4 are connected using two lines: one line connects BR1 and BR2, and the other line connects BR3 and BR4. Additionally, a distance protection scheme that tumbles the breaker to detect faults can be used by IEDs. This scheme is used because there is no internal validation mechanism that detects whether the detected faults are faked or valid. Moreover, operators can be used to launch commands to the IEDs to tumble the breakers. The IEDs are connected to the wired side of the network through a substation switch.

The following are examples of attacks (along with their purposes) that can be launched by intruders to harm the IoT environment (i.e., industrial control system):
   Remote tripping command injection: the breaker is open as a result of issuing a command (i.e., launching remote tripping command injection) to a relay
   Data injection: this attack can be implemented by tweaking values of parameters such as sequence components, current, and voltage to mimic a valid fault, and it affects the operator (the operator encounters a blackout)
   Relay setting change: the attacker utilizes the distance protection scheme (used to configure relays) to alter the relay settings in order to block their functions. Thus, the relay will not be able to trip for either a valid command or a proper fault.

As stated above, it is difficult to implement security solutions such as encryption that require cedent computation resources in low-constrained IoT devices. The importance of NIDs comes into play here: it can be implemented for powerful computers or even servers at the edge of the IoT environment, and it can act as the first line of defense for all devices within the IoT environment. However, deploying a consolidated NIDS that works in any IoT environment is a heavy-duty task as these heterogenous smart things each have different characteristics and the traffic generated by these devices is often distinct (i.e. the traffic of legitimate IoT devices in a given IoT environment may be different from traffic generated by legitimate IoT devices in another IoT environment). Accordingly, conventional NIDS solutions remain problematic.

Computer-implemented methods for detecting suspicious traffic in a networked environment and/or protecting a networked environment from suspicious/malicious traffic are also provided. Such methods can be implemented in a networked environment as previously described (e.g., via the Internet, a LAN network, a WAN, etc.) and executed using any of the processing systems described herein. In certain embodiments, the processing system comprising an integrated circuit (e.g., integrated circuit 110) for performing neural network computations in communication with one or more non-transitory computer storage media (e.g., at least one database 350).

The methods can be executed on an integrated circuit (e.g., integrated circuit 110) and, in certain embodiments, comprise processing generating instructions that, when executed by the integrated circuit, cause the integrated circuit to perform the neural network computations in hardware (e.g., the processor). In certain embodiments, the neural network computations comprise a first network architecture (e.g., one or more sets of stacked ResNet models 212) and a second network architecture (e.g., meta-classification model 222). Both the first and second network architectures can be stored in one or more non-transitory computer storage media such as, for example and as noted above, at least one database 350.

The first network architecture can be any of the stacked ResNet models 212 described herein. For example, and without limitation, the first network architecture can comprise a set of at least two stacked ResNet models (e.g., ResNet models 212). Each ResNet model can comprise at least one ResNet block (e.g., ResNet block 214), with each ResNet block comprising at least two convolutional layers comprising one or more convolutional filters. Further, each stacked ResNet model of the set can be individually trained. In certain embodiments, each path of a ResNet block can share the same topology. In certain embodiments, each path of a ResNet block comprises different topologies.

The second network architecture can comprise any of the meta-classification models 222 described herein. In certain embodiments, the meta-classification model comprises at least three layers comprising two dense layers and a fully connected layer.

Certain embodiments of the method comprise processing, with the first network architecture executed by the integrated circuit, first input data collected from a network (e.g., a network of IoT devices) to result in contribution outputs related to characteristics of activities within the network (e.g., first set of outputs 115). This first input data can be, for example, network traffic data between one or more or two or more IoT devices in communication via the network and can provide a baseline summary of the traffic over a network between the IoT devices. In certain embodiments, the method can additionally comprise monitoring the network and collecting the first input data therefrom.

In certain embodiments, processing the first input data from the network of IoT devices further comprises transforming the first input data through a series of at least two convolutional layers of each ResNet block to generate the contribution outputs. Operation of each ResNet block, for example, can be defined as:

$$X^{i+1}=L^n(X),$$

$$X^{i+2}=L^{n+1}(X^{i+1}),$$

$$X^{i+3}=L^{n+2}(X^{i+2})+X, \quad (1)$$

where X is input data of the first set of input data obtained from the network, L is the convolutional layer, n is the index of the convolutional layers, and i is 1 to 5. There, the fully connected layer of the meta-classification model can additionally further comprise a Softmax function.

Processing the first set of input data can further comprise feeding output of each convolutional filter directly to a rectified linear unit systems (ReLU) activation function to transform each value to the same if it is positive. Optionally, processing the first set of input data from a network can also further comprise padding the output of each convolutional filter with zeros so the output feature map has the same length as the data of the first set of input data obtained from the network.

The contribution output can, if desired, be further reduced and downsampled using pooling (e.g., average pooling) after the last ResNet block in each ResNet model of the set processes such input data. In certain embodiments, the pooling is average pooling size of 2, with a stride of 2. For example, average pooling can be defined as:

$$y = \frac{1}{k}\sum_{l=1}^{k} ml, \quad (5)$$

where k is the size of the average pooling and m is each region downsampled by computing the average of its values.

The methods hereof can further comprise generating, with the integrated circuit, a training data set from a combination of the contribution outputs of the first network architecture (i.e. the training process). The meta-classification model of the second network architecture can then be trained using the training data set (e.g., using the integrated circuit). In certain embodiments, each convolutional filter of each ResNet block comprises one or more kernels and training the meta-classification model further comprises initializing a weight matrix of each kernel using a Glorot (Xavier) uniform initializer at the beginning of training as follows:

$$l = \sqrt{6/f_{in} + f_{out}} \quad (4)$$

where $f_{in}$ is the number of input units in the weight matrix and $f_{out}$ is the number of output units in the weight matrix.

When trained, the processing system can then be used to process second input data collected from the network (e.g., network traffic data between one or more IoT devices in communication via the network). For example, in certain embodiments, the method further comprises monitoring and collecting the second input data from the network. Executing the trained meta-classification model (executed by the integrated circuit) outputs class scores that identify one or more portions of the second input data obtained from the monitored network as suspicious or benign. Such portions of the second input data can be data packets, network packets, input vectors, data traffic, and/or any other type of data flow sent over the network between devices and/or servers in connection therewith. In certain embodiments, the first and second sets of input data can comprise traffic data from the same network but taken at different times. Accordingly, the trained processing system can monitor a network's data flow and, once trained, identify if any traffic on that network (e.g., between IoT devices or otherwise) is suspicious or malicious (i.e. a significant enough outlier as compared to the threshold values determined by the training data set).

Upon identifying suspicious or malicious network traffic data, at least one IoT device from which the identified suspicious or malicious data originated can be isolated from the network. In this way, security risk can be mitigated as the remaining IoT devices and other devices in the networked environment are protected against additional vulnerabilities or attack. Additionally, security measures can be deployed on the one or more isolated IoT devices and/or networked environment including, for example, mapping data and information circulated within the IoT environment (e.g., credentials in automation servers and IoT devices, data gathered by sensors and devices deployed in the environment, etc.) and/or deploying mitigation protocols such as loading security patches and/or updates on the isolated IoT devices (and/or other IoT devices within the network), updating the isolated IoT devices software with using secure coding practices, implementing/activating secure authentication protocols with one or more of the isolated IoT devices, and any backend control systems or management consoles in communication with the networked environment, and/or employing encryption and/or firewall techniques. Additional security measures that can be employed in connection with the present methods will become apparent to one of ordinary skill in the art in view of the present disclosure and all such can be deployed in connection with the methods hereof.

The present systems and methods leverage the benefits of an NIDS approach in combination with the ability to deeply learn the characteristics of the IoT devices within a network such that intruders can be quickly and accurately detected (e.g., in real time).

As supported by the data presented herein, the architecture of the stacked deep learning systems and methods hereof improve the performance (e.g., in terms of accuracy) of conventional NIBS approaches deployed in the IoT paradigms. Indeed, the systems and methods hereof (e.g., utilizing the stacked deep learning architecture comprising at least 5 pretrained ResNet models) accurately identified IoT cyberattacks, achieved promising results on two widely used datasets involving IoT traffic, and was more thorough and able to detect an increased number of attacks as compared to conventional methods.

As supported in the below Examples, the methods provided herein are more accurate than conventional methods in detecting an IoT cyberattack.

All network parameters for the method of the present disclosure, such as the number of epochs, the number of filters, ResNet blocks, and the number of neurons in the dense layers, were determined empirically. For example, the number of epochs was determined empirically based on what would most likely facilitate the method described herein to learn the characteristics of the samples provided in the dataset. In at least one embodiment, the number of epochs is 200.

In view of that, during the training process, the systems and methods hereof can be optimized very smoothly and reach the local optima, as shown in FIGS. 8(*a*) and 8(*b*) (i.e. displaying the convergence of the meta-classification model 222, with FIG. 48(*a*) showing the accuracy against the number of epochs and FIG. 8(*b*) showing the loss against the number of epochs). FIGS. 8(*a*) and 8(*b*) show both the accuracy (FIG. 8(*a*)) and the loss function (FIG. 8(*b*)) during the training process of the meta-classification model 222 of the systems and methods hereof It was also noted how decreasing or increasing the number of ResNet blocks reduced the accuracy. In certain embodiments, it was determined that five ResNet models was optimal. Further, decreasing the number of epochs above 200 decreased the accuracy, while increasing the number of epochs above 200 did not significantly improve the result and instead increased the computation time in some applications.

In sum, malicious attacks that target IoT devices and environments are very challenging issues. They target IoT devices and can cause serious problems such as data leakage, phishing, and spamming campaigns, DDoS attacks, and security breaches. The systems and methods hereof utilize a residual block architecture to identify activities that might harm the IoT environment. Such systems and methods were evaluated against several machine learning algorithms and two related work methods for validation purposes (described below). Further, the systems and methods hereof were evaluated against two well-known datasets from two heterogeneous IoT environments. The experimental results support that the systems and methods hereof are able to deeply learn the characteristics of heterogenous IoT devices in various IoT environments. Furthermore, the systems and methods hereof have better predictive performance as compared to related conventional approaches.

Certain Definitions

As used herein, "DDoS" means distributed denial-of-service. "ICS" means industrial control system. "VGG" means visual geometry group. "RAM" means random access memory. "Xception" means extreme inception. "IED" means intelligent electronic devices. "CIA" means confidentiality, data integrity, and availability. "ANN" means artificial neural network. "KNN"means k-nearest neighbors. "RNN" means recurrent neural network. "LSTM" means long short-term memory. "LR" means logistic regression. "LDA" means linear discriminant analysis. "QDA" means quadratic discriminant analysis. "XGB" means eXtreme gradient boosting. "MLP" means multilayer perception. "RSS" means random subspace. "GB" means gradient boosting. "DNS" means domain name system. "HTTP" means hypertext transfer protocol. "WLAN" means wireless local area network. "WiFi" means wireless fidelity. "MAC" means media access control.

As used herein and in the appended claims, the singular forms "a," "and," and "the"include plural referents unless the context clearly dictates otherwise. Thus, for example, reference to "a ResNet model" includes a plurality of such models. The term "about," when referring to a number or a numerical range, means that the number or numerical range referred to is an approximation within experimental variability (or within statistical experimental error), and thus the number or numerical range may vary between 1% and 15% of the stated number or numerical range.

The term "comprising" (and related terms such as "comprise" or "comprises" or "having"or "including") is not intended to exclude an embodiment of any compound, composition, method, process, or the like that may "consist of" or "consist essentially of" the described features. The invention illustratively described herein may be suitably practiced in the absence of any element(s) or limitation(s), which is/are not specifically disclosed herein.

The terms and expressions, which have been employed, are used as terms of description and not of limitation. In this regard, where certain terms are defined, described, or discussed in the "Detailed Description," all such definitions, descriptions, and discussions are intended to be attributed to such terms. There also is no intention in the use of such terms and expressions of excluding any equivalents of the features shown and described or portions thereof. Furthermore, while subheadings, are used in the "Detailed Description," such use is solely for ease of reference and is not intended to limit any disclosure made in one section to that section only; rather, any disclosure made under one subheading is intended to constitute a disclosure under each and every other subheading.

EXAMPLES

The following examples serve to illustrate the present disclosure. The examples are not intended to limit the scope of the claimed invention in any way.

Keras, the deep learning library for Python programming language, was used to implement the method and control methods (for comparison purposes) were implemented using scikit-learn (the Python machine learning library). All experiments were conducted using a laptop running the Windows 10 operating system with 16 GB RAM.

In the experiments described herein, real-case study scenarios were utilized and carried out in an industrial control system (ICS) (i.e. a smart grid setting) and a smart home setting.

Example 1: Power System Dataset

The first dataset used was a power system dataset that is part of the ICS Cyberattack Dataset collection. The power system dataset is divided into three different subdatasets, categorized according to the number of classes they include (e.g., binary-class subdataset, three-class subdataset, and multiclass subdataset), however, for the present investigation, the focus was on the binary-class subdataset.

The binary-class subdataset has 15 different datasets. Table 3 shows the number of instances in the binary-class subdataset. The number of samples is 78,377, in which the number of normal class samples is 22,714, and the number of abnormal class samples is 55,663. The number of features is 128.

TABLE 3

The number of instances in each subdataset of the power system database.

| Dataset | Samples | Dataset | Samples | Dataset | Samples |
|---------|---------|---------|---------|---------|---------|
| 1  | 4966 | 2  | 5069 | 3  | 5415 |
| 4  | 5202 | 5  | 5161 | 6  | 4967 |
| 7  | 5236 | 8  | 5315 | 9  | 5340 |
| 10 | 5569 | 11 | 5251 | 12 | 5224 |
| 13 | 5271 | 14 | 5115 | 15 | 5276 |

The cyberattacks launched to generate abnormal traffic were data injection and relay setting change. Each sample (instance) in the binary subdataset was classified into a normal event or an attack event. The power system and its details are publicly available at https://sites.google.com/a/uah.edu/tommy-morris-uah/ics-data-sets and in Beaver et al., "An Evaluation of Machine Learning Methods to Detect Malicious SCADA Communications," in the Proceedings of 2013 12th International Conference on Machine Learning and Applications (ICMLA), 2:54-59 (2013), which is hereby incorporated by reference herein.

Each of the 15 power system subdatasets were split into 70% for training and 30% for testing. For example, in the first subdataset, there were 3790 training samples and 1625 testing samples. Each sample was classified as attack or normal. Each of the five base-level ResNet models were pretrained individually using the training set. Using the 30% test dataset, the output of these five ResNet models was fed into the meta-classification model as features. Thus, the meta-classification model was trained on the outputs of the base-level models.

The performance of the method of the present disclosure was evaluated against three conventional approaches, including two methods recently proposed to detect malicious attacks in the industrial control system environment and the smart home setting (i.e. blockchain and random subspace learning-based IDS and intrusion detection techniques based on statistical flow features). Several machine learning algorithms were also tested, of which random forest achieved the best accuracy. The most accurate method (i.e. the random forest ensemble method) among the tested methods was included in this investigation to further evaluate the methods of the present disclosure.

For the binary class, the method of the present disclosure achieved the best performance in terms of accuracy on all subdatasets. The results of the method when applied to the power system dataset are shown in FIG. 9.

The average accuracy of the method of the present disclosure as compared to the accuracies of the conventional methods is shown in FIG. 7(a). The average accuracy was calculated as the accuracy of the tested methods on each subdataset divided by the number of subdatasets. As shown in FIG. 7(a), the method of the present disclosure outperformed the other methods when tested on the power system dataset, with an average accuracy of 97.5%, which was significantly better than that of the other methods (the second most accurate method was random forests at 94%).

Example 2: IoT Botnet Attack Dataset (N-BaIoT)

The N-BaIoT dataset includes nine subdatasets collected from nine IoT devices: Danmini Doorbell, Ecobee Thermostat, Ennio Doorbell, Philips B120N10 Baby Monitor, Philips B120N10 Baby Monitor2, provision PT 737E Security Camera, Provision PT 838 Security Camera, Samsung SNH 1011 N Webcam, SimpleHome XCS7 1002 WHT Security Camera, and SimpleHome XCS7 1003 WHT Security Camera. Each of the nine sets had malicious data that could be divided into 10 attacks, which were carried out by two botnets (i.e. these attacks are integrated into the "attack" class), plus one class of "benign." The details of the three subdatasets of the N-BaIoT dataset that were used in the present investigations are shown in Table 4.

TABLE 4

Details of each N-BaIoT subdataset.

| Data set | Benign | Total |
| --- | --- | --- |
| Ecobee Thermostat | 39,100 | 835,876 |
| Ennio Doorbell | 13,113 | 355,500 |
| Samsung SNH 1011 N Webcam | 52,150 | 375,222 |

The N-BaIoT datasets and their details are publicly available at the Machine Learning Repository made available online by the Center for Machine Learning and Intelligent Systems, Bren School of Information and Computer Science, University of California, Irvine.

Three of the nine subdatasets of the N-BaIoT dataset were utilized to evaluate the method of the present disclosure. Similar to Example 1, the subdatasets were divided into 70% for training and 30% for testing. The results of all methods, including the method of the present disclosure, are depicted in FIG. 7(b) and support that the method of the present disclosure outperformed the conventional methods in terms of accuracy. The accuracy of the method described herein and the accuracy of the second-best method (random forests) are 100% and 99.9991%, respectively.

Example 3: Detecting Intrusions in Real Time

The system and methods described herein are capable of detecting intrusions in real time. The target dataset to measure the detection time for one packet was the power system dataset described in Example 1 above. The number of samples in the dataset is 78,377. The dataset was split into 70% and 30% for testing for each subdataset as described above, which resulted in approximately 23,513 samples for testing and the remainder for training.

The total testing time for the 23,513 samples by the method of the present disclosure was 15,811 milliseconds. The detection time for one packet is the number of samples in the testing set (i.e. 23,513) divided by the total testing time (i.e. 15,811 milliseconds). Thus, the testing time for one packet was around 1.49 ms, which is under the real-time limit.

Example 4: Optimizers

Figure 10C:
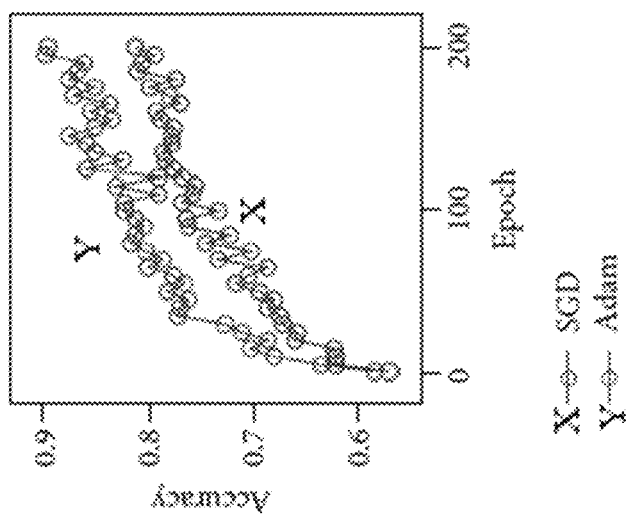
FIGS. 10(a)-10(c) show graphical data related to test accuracy for four adaptive learning rate techniques, with Adam optimization versus RMSProp optimizer shown in FIG. 10(a), Adam optimization versus AdaGrad optimizer shown in FIG. 10(b), and Adam optimizer versus SGD optimizer shown in FIG. 10(c).
Figure 10B:
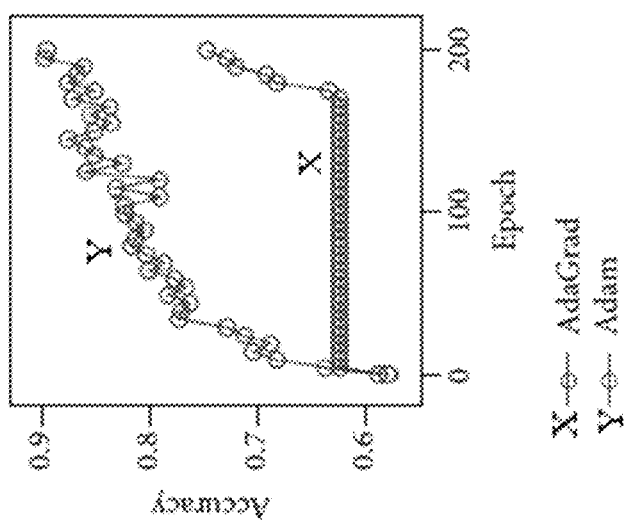
Figure 10A:
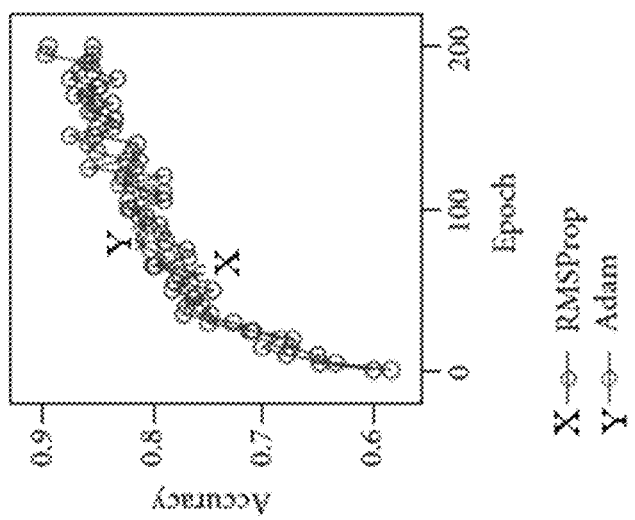

The performance of several optimizers, namely, Adam optimizer, the RMSProp optimizer, SGD optimizer, and AdaGrad optimizer, were evaluated in conjunction with performance of the method described herein. The results identified that the inclusion of Adam optimizer resulted in the best performance (notably it had the advantages of both the RMS Prop optimizer and AdaGrad optimizer). FIGS. 10(a)-10(c) show the accuracy of the method of the present disclosure during the training phase when using each of these optimizers.

The invention claimed is:
1. A computer-implemented method for protecting a networked environment from malicious traffic comprising executing on an integrated circuit the steps of:
processing, with a first network architecture stored in one or more non-transitory computer storage media, first input data collected from a network of Internet-of-Things (IoT) devices to result in contribution outputs related to characteristics of activities within the network, the first network architecture comprising a set of at least two stacked residual network (ResNet) models each comprising at least one ResNet block, wherein each ResNet block comprises at least two convolutional layers comprising one or more convolutional filters, and each stacked ResNet model of the set being independently trained, wherein the processing of the first input data from the network comprises:
transforming the first input data through a series of the at least two convolutional layers of each ResNet block, and operation of each ResNet block is defined as:

$$X^{i+1}=L^n(X),$$

$$X^{i+2}=L^{n+1}(X^{i+1}),$$

$$X^{i+3}=L^{n+2}(X^{i+2})+X, \quad (1)$$

where X is the data obtained from the network, L is the convolutional layer, n is the index of the convolutional layers, and i is 1 to 5, and the fully connected layer of the meta-classification model comprises a Softmax function;

generating a training data set from a combination of the contribution outputs of the first network architecture;

training a second network architecture comprising a meta-classification model using the training data set, the meta-classification model comprising at least two dense layers and a fully connected layer; and collecting and processing second input data from the network with the trained meta-classification model to output class scores identifying one or more portions of the second input data as suspicious or benign, wherein the second input data comprises network traffic data between two or more of the IoT devices.

2. The method of claim 1, further comprising:

upon identifying a suspicious network traffic data, isolating at least the IoT device from which the identified suspicious data originated from the other IoT devices in the network.

3. The method of claim 2, further comprising deploying one or more security measures on the at least one isolated IoT device or the networked environment.

4. The method of claim 1, wherein:

the set of at least two stacked ResNet models of the first network architecture comprises at least 5 stacked ResNet models and each ResNet model comprises at least 10 ResNet blocks; and processing the first input data from a network further comprises transforming the first input data from the network through a series of the at least two convolutional layers of each ResNet block to generate the contribution outputs.

5. The method of claim 1, wherein processing the first input data from a network further comprises feeding output of each convolutional filter directly to a rectified linear unit systems (ReLU) activation function to transform each value to the same if it is positive.

6. The method of claim 5, wherein processing the first input data from a network further comprises padding the output of each convolutional filter with zeros so the output feature map has the same length as the second input data collected from the network.

7. The method of claim 1, further comprising reducing and downsampling the contribution outputs using pooling after the last ResNet block in each ResNet model processes such first input data.

8. The method of claim 7, wherein the pooling is average pooling.

9. The method of claim 7, wherein pooling is average pooling size of 2, with a stride of 2.

10. The method of claim 8, wherein each convolutional filter of each ResNet block comprises one or more kernels and training the meta-classification model further comprises initializing a weight matrix of each kernel using a Glorot (Xavier) uniform initializer at the beginning of training as follows:

$$l=\sqrt{6/\mathfrak{f}_{in}+\mathfrak{f}_{out}} \quad (4)$$

where $\mathfrak{f}_{in}$, is the number of input units in the weight matrix and $\mathfrak{f}_{out}$ is the number of output units in the weight matrix.

11. The method of claim 8, wherein average pooling is defined as $$y = \frac{1}{k}\sum_{l=1}^{k} ml, \quad (5)$$

where k is the size of the average pooling and m is each region downsampled by computing the average of its values.

12. A system for protecting a networked Internet-of-Things (IoT) environment comprising:

a first module comprising:

at least one set of at least two stacked residual network (ResNet) models each comprising a plurality of ResNet blocks, wherein each ResNet block comprises at least two convolutional layers and operation of each ResNet block is defined as:

$$X^{i+1}=L^n(X),$$

$$X^{i+2}=L^{n+1}(X^{i+1}),$$

$$X^{i+3}=L^{n+2}(X^{i+2})+X, \quad (1)$$

where X is the data obtained from the network, L is the convolutional layer, n is the index of the convolutional layers, and i is 1 to 5;

a second module comprising a meta-classification model comprising at least two dense layers and a fully connected layer;

at least one non-transitory computer storage media comprising at least the first module and the second module stored therein; and an integrated circuit in communication with the at least one non-transitory computer storage media;

wherein the integrated circuit executes the first module to:

process a first set of input data from a network with the at least one set of stacked ResNet models to result in a first output from each of the ResNet models related to characteristics of activities within the network, and compile a training data set from a combination of the first outputs of the ResNet models, and wherein the integrated circuit executes the second module to:

train the meta-classification model based on the training data, process a second set of input data from the network with the trained meta-classification model, and output class scores identifying the data obtained from the network as suspicious or benign.

13. The system of claim 12, wherein the input data from the network comprises an input vector.

14. The system of claim 12, further comprising at least one IoT device operatively connected to the network, and the data obtained from the network comprises a packet to be transmitted by a first IoT device to a target IoT device.

15. The system of claim 13, wherein the fully connected layer of the meta-classification model comprises a Softmax function configured for classification purposes and defined as:

$$f_i(s) = \frac{e^{s_i}}{\sum_{j=1}^{J} e^{s_j}} \text{ for } i = 1, \ldots, J,$$

where s is the input vector, and the meta-classification model outputs a vector that has values between zero and one and that has a sum of one.

16. The system of claim 12, wherein the first dense layer of the meta-classification model comprises 40 neurons and the second dense layer of the meta-classification model comprises 20 neurons.

17. The system of claim 12, wherein each convolutional layer of a ResNet block comprises 16 convolutional filters that output 16 feature maps.

18. The system of claim 12, wherein the size of each convolutional filter is 9, with a stride of 1.

19. The system of claim 12, wherein each convolutional layer of a ResNet block is a 1D convolutional layer.

\* \* \* \* \*